(12) United States Patent
Chan et al.

(10) Patent No.: US 8,402,442 B1
(45) Date of Patent: Mar. 19, 2013

(54) COMMON DEBUGGER METHOD AND SYSTEM

(75) Inventors: Chi Bun Chan, San Jose, CA (US); Jingzhao Ou, San Jose, CA (US); Nabeel Shirazi, Saratoga, CA (US)

(73) Assignee: Xilinx, Inc., San Jose, CA (US)

( * ) Notice: Subject to any disclaimer, the term of this patent is extended or adjusted under 35 U.S.C. 154(b) by 903 days.

(21) Appl. No.: 12/510,810

(22) Filed: Jul. 28, 2009

(51) Int. Cl.
*G06F 9/44* (2006.01)
*G06F 11/00* (2006.01)

(52) U.S. Cl. .......... 717/127; 717/124; 717/135; 714/25; 714/48

(58) Field of Classification Search ........... 717/124–135
See application file for complete search history.

(56) References Cited

U.S. PATENT DOCUMENTS

| | | | |
|---|---|---|---|
| 6,219,782 B1* | 4/2001 | Khan et al. | 712/227 |
| 7,478,366 B2* | 1/2009 | Bickson et al. | 717/124 |
| 8,010,843 B2* | 8/2011 | Righi et al. | 714/32 |
| 2003/0233634 A1* | 12/2003 | Carrez et al. | 717/124 |
| 2004/0210872 A1* | 10/2004 | Dorr et al. | 717/124 |
| 2005/0165597 A1* | 7/2005 | Nightingale | 703/27 |
| 2005/0183066 A1* | 8/2005 | Jabori | 717/124 |
| 2006/0253842 A1* | 11/2006 | Pees et al. | 717/129 |
| 2008/0244325 A1* | 10/2008 | Tyulenev | 714/38 |

OTHER PUBLICATIONS

Common Debug Architecture Library, IBM, Mar. 2004 CrossView Pro Debugger, Altium BV, 2005 Generic Debug Instrument Interface (GDI), Tasking, Jan. 14, 1998, rev 1.2.6.*
Power.org™ Common Debug Interface Technical Subcommittee White Paper on a Common Debugging Framework, Burton et al., Power.org, 2007.*
Xdebug Documentation Protocol DBGp, xdebug.org, ver 1.0, draft 17 Power.org™ Standard for Common Debug Interface API, Power.org, Sep. 18, 2008.*
Burton et al. (Power.org™ Common Debug Interface Technical Subcommittee White Paper on a Common Debugging Framework, Burton et al, 2003, p. 4).*

* cited by examiner

*Primary Examiner* — Wei Zhen
*Assistant Examiner* — Daniel P Elliott
(74) *Attorney, Agent, or Firm* — LeRoy D. Maunu; Lois D. Cartier

(57) ABSTRACT

Disclosed are approaches for operating a plurality of debugger tools. A common debugger receives first-type commands for processing. Each first-type command references one of the debugger tools. Each debugger tool provides control over a respective set of one or more components of the electronic system and recognizes a respective set of tool-specific commands. Each input first-type command is translated into a respective tool-specific command that is compatible with the one of the debugger tools specified in the first-type command. Each respective tool-specific command from the common debugger is provided to the one of the debugger tools specified in the input first-type command from which the respective tool-specific command was translated. Each translated tool-specific command is performed by the targeted debugger tool.

17 Claims, 4 Drawing Sheets

COMMON DEBUGGER METHOD AND SYSTEM

FIELD OF THE INVENTION

The present invention generally relates to tools for debugging electronic circuit designs.

BACKGROUND

In developing an electronic system, a number of different tools are sometimes used to debug the different components of the system. For example, a video analytic design includes a microprocessor, a hardware-based video processing pipeline including DSP modules, and several input/output (I/O) interfaces to external peripherals. Some DSP modules may be developed using a high-level modeling system (e.g., System Generator for DSP from XILNX, Inc.), while other modules are written in low-level hardware description languages (HDLs). Some DSP modules are emulated in hardware under the control of a hardware co-simulation tool. Other DSP modules written in HDL are simulated using an HDL simulator. A logic analyzer may be used to capture data that appears at the I/O interfaces of the emulated hardware. Still other modules may be implemented as software and an embedded system software debugger is used to debug the program.

In debugging such a complex system, the different tools may be used in sequence or concurrently to control the simulation and gather the desired data. However, working with the different tools and having to switch between them is cumbersome. Having to simultaneously interact with multiple ones of the tools is even more difficult.

The present invention may address one or more of the above issues.

SUMMARY

In one embodiment of the invention, a method is provided for operating a plurality of debugger tools in an electronic system. The method includes inputting first-type commands to a debugger that is executing on a computing arrangement. Each first-type command references one of the debugger tools, and each of the debugger tools provides control over a respective set of one or more components of the electronic system. Each debugger tool recognizes a respective set of tool-specific commands for operating the debugger tool, and the tool-specific commands are incompatible between debugger tools. Each input first-type command is translated into a respective tool-specific command that is compatible with the one of the debugger tools specified in the first-type command. Each respective tool-specific command is output from the common debugger to the specified one of the debugger tools. The specified one of the debugger tools performs the respective tool-specific command.

In another embodiment, a method for operating two or more debugger tools in an electronic system includes coupling the debugger tools to a common debugger. Each of the debugger tools provides control over a respective set of one or more components of the electronic system via a respective command entry interface. For each one of the debugger tools, in response to input to the one debugger tool of a command referencing a component of the respective set controlled by another one of the debugger tools, the component controlled by the another one of the debugger tools is accessed from the command entry interface of the one debugger tool via the common debugger. In response to a script of commands input to the common debugger, in which one or more of the commands specifying a particular one of the debugger tools, the commands of the script are translated into tool-specific commands for the particular one debugger tool, and the tool-specific commands are provided to the particular one debugger tool.

An article of manufacture is provided in another embodiment. The article of manufacture comprises a processor-readable storage device storing executable instructions for operating a plurality of debugger tools in an electronic system. The instructions when executed by one or more processors cause the one or more processors to perform the operations including inputting first-type commands to a debugger that is executing on a computing arrangement. Each first-type command references one of the debugger tools, and each of the debugger tools provides control over a respective set of one or more components of the electronic system. Each debugger tool recognizes a respective set of tool-specific commands for operating the debugger tool, and the tool-specific commands are incompatible between debugger tools. Each input first-type command is translated into a respective tool-specific command that is compatible with the one of the debugger tools specified in the first-type command. Each respective tool-specific command is submitted from the common debugger to the specified one of the debugger tools. The specified one of the debugger tools performs the respective tool-specific command.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

The embodiments of the invention provide interoperability between different debugger tools and integrate the capabilities of the tools by providing a common interface for accessing the different tools. A common debugger runtime environment (CDRE) acts as a bridge that makes different debugger tools interoperable. One debugger tool can be operated via its native interface to control and access debugger information pertaining to design components controlled by another debugger tool. The CDRE translates a debugger operation entered in one tool into a corresponding operation for another debugger tool. The CDRE also provides an application programming interface (API) which may be used to access the capabilities of the different debugger tools in a uniform and tool-independent manner. The API makes it easy for a designer to create a script to programmatically control the interactions of the different debugger tools, as well as to automate testing of the entire design.

Figure 1:
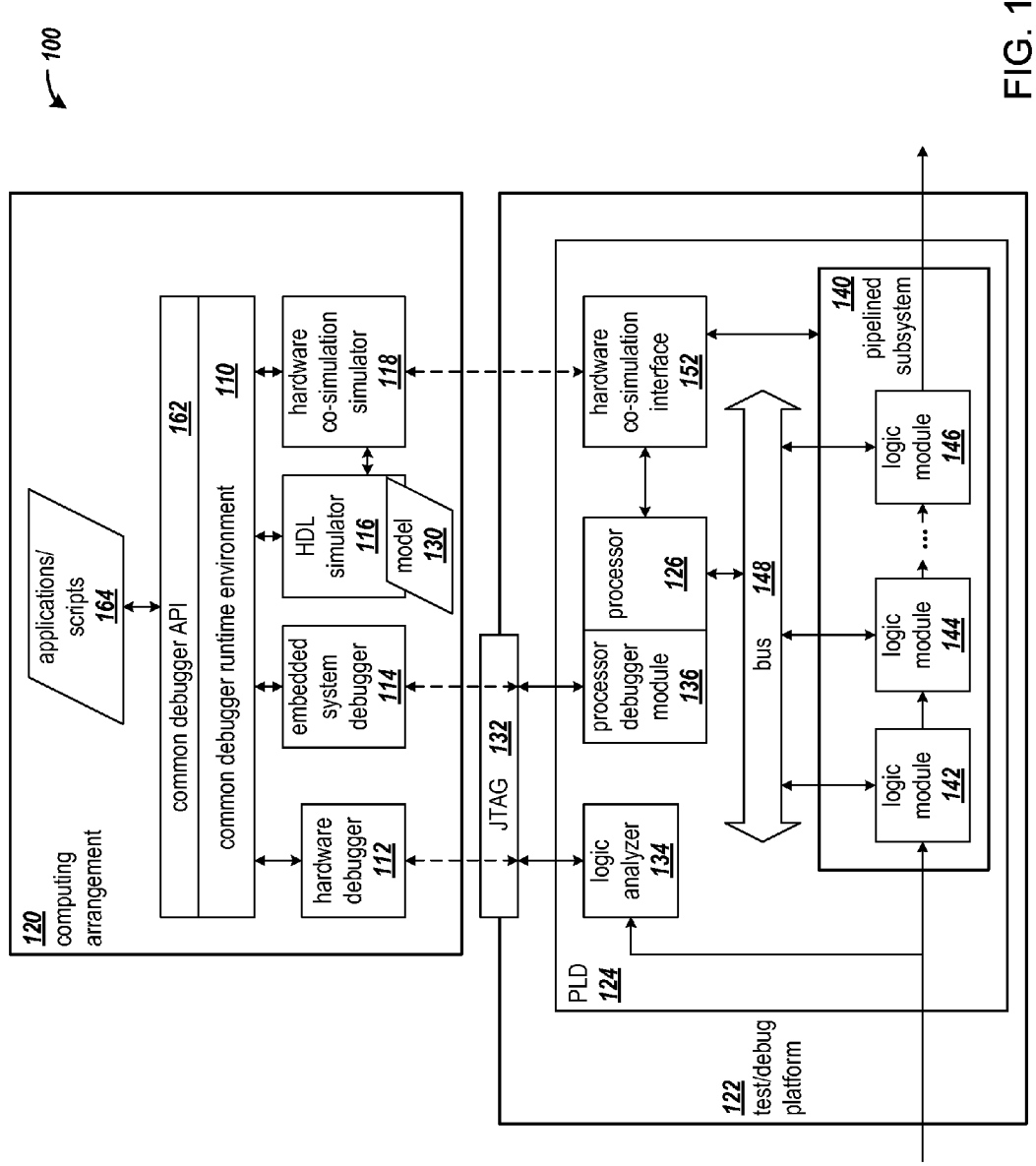
FIG. 1 is block diagram of an example system for operating multiple debugger tools in accordance with one or more embodiments of the invention.

FIG. 1 is a block diagram of an example system 100 for operating multiple debugger tools in accordance with one or more embodiments of the invention. To illustrate the scope of the CDRE, different debugger tools are shown in combination with components of an example system under test. Each debugger tool may be comprised of multiple modules for interfacing with the targeted components of the system under test. Each of the debugger tools provides debugging control over various components or signals of the system under test.

The debugger tools include one or more software modules that provide a user interface for controlling the debugger tool. Some debugger tools also simulate a portion of the design in software. Thus, certain modules of the debugger tools include software that executes on a computing arrangement. In FIG. 1, the example debugger tools include a hardware debugger 112, an embedded system debugger 114, an HDL simulator/debugger 116, and a hardware co-simulation simulator 118. The hardware debugger, embedded system debugger, HDL simulator/debugger, and hardware co-simulation simulator execute on computing arrangement 120, which includes, for example, one or more processors, a memory, and suitable input/output capabilities. The embodiments of the present invention operate with two or more of the debugger tools.

The different debugger tools permit a portion of the design to be simulated on the computing arrangement 120 and a portion of the design to be emulated on a test/debug platform 122. The test/debug platform includes hardware resources for emulating selected portions of the design. Such a test/debug platform may include one or more printed circuit boards and one or more programmable logic devices (PLDs) 124 such as field programmable gate arrays (FPGAs). The PLD may include an embedded processor 126 for executing software portions of the design.

The example system under test includes software (not shown) executing on processor 126, a pipelined subsystem 140, and a simulation model 130, which is generated from an HDL specification, for example. The pipelined subsystem includes a plurality of pipelined logic modules 142, 144, and 146, for example. The processor is coupled to the logic modules via bus 148. The different debugger tools provide debugger access to these components of the system.

The hardware debugger 112 allows the capture and examination of signals in a design while using the actual hardware device. The hardware debugger interacts with the system under test via a JTAG interface 132. A logic analyzer 134 is created using PLD resources, and the logic analyzer samples states of one or more signals. The states of the selected signals are provided to the hardware debugger.

The embedded system debugger 114 supports debugging of software executing on embedded processor 126. A processor debugger module 136 is implemented in PLD programmable logic for reading state information from or providing state information to the processor as defined by debugging needs. The embedded system debugger interfaces with the debugger module via JTAG interface 132. An example of software that includes an embedded system debugger is the Embedded Development Kit for software development from XILINX.

The HDL simulator 116 simulates all or part of the system under test as a software model 130 of the design. The HDL simulator may operate in conjunction with the hardware co-simulation simulator 118, which interacts with a portion of the design emulated on the PLD. The portion of the example system which is emulated on the PLD is the pipelined subsystem 140. The hardware co-simulation interface 152 provides the interface through which the hardware co-simulation simulator 118 interacts with the pipelined subsystem 140. An example HDL simulator is the ISim HDL simulator from XILINX, and an example hardware co-simulation simulator is provided with System Generator for DSP, also from XILINX.

In one embodiment, a designer may enter commands via one of the debugger tools and those commands may reference a component of the design controlled by another one of the debuggers. For example, the designer may enter a command via the user interface of hardware debugger 112 where the command references a component of the design, for example, the pipelined subsystem 140, which is controlled by the hardware co-simulation simulator 118. Each of the debugger tools is adapted to recognize a reference to a component that is controlled by another one of the debuggers. When such a component is referenced, the command is forwarded to the common debugger runtime environment (CDRE) 110, which translates the command into a format suitable for the debugger tool which controls the referenced object. The CDRE then submits the reformatted command to the proper debugger tool, and the debugger tool performs the specified command. Any data obtained by the debugger tool in processing the command is returned to the CDRE and then to the debugger tool from which the command was entered.

In another embodiment, a common debugger application programming interface 162 (API) is provided for interfacing with the CDRE 110. The common debugger API allows programs or scripts 164 to access the functions of the CDRE by way of program calls to those functions.

Figure 2:
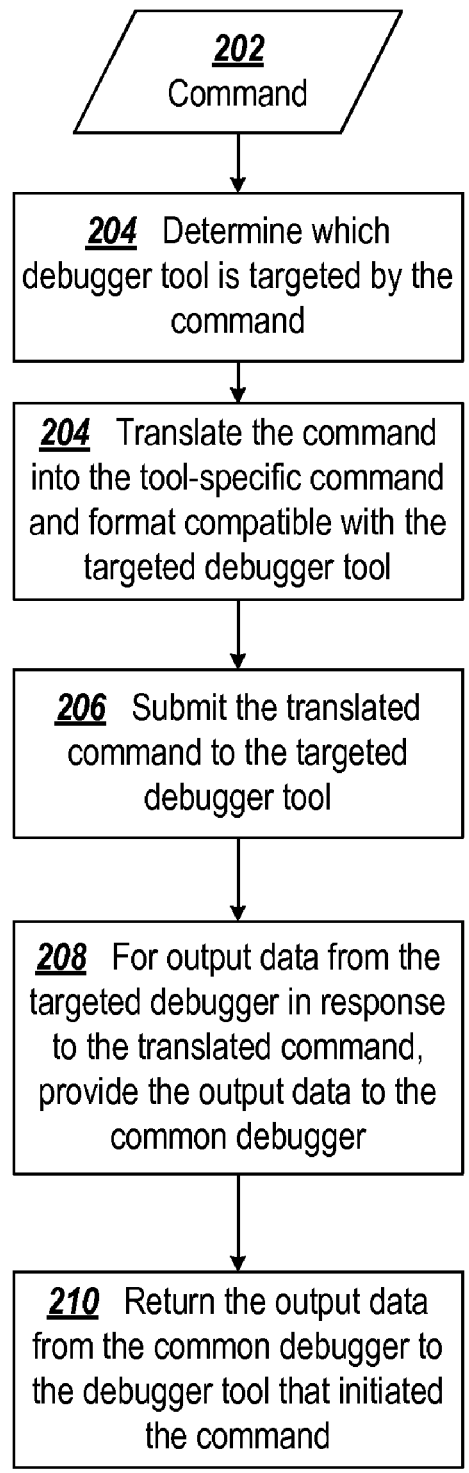
FIG. 2 is a flowchart of an example process performed by the common debugger runtime environment (CDRE) in accordance with one or more embodiments of the invention.

FIG. 2 is a flowchart of an example process performed by the common debugger runtime environment (CDRE) in accordance with one or more embodiments of the invention. The CDRE generally processes commands that are targeted to a particular component of a system under test where that component is controlled by a particular debugger tool.

The input command 202 may be from one of the debugger tools, from a script, or provided as a parameter in a function call to the common debugger by a debugger application program.

At step 204, the CDRE determines which debugger tool is targeted by the command. A command generally includes the name of the command and one or more parameters. One of the parameters references the component that is targeted by the command. In CDRE, a hierarchical path identifier is used to uniquely identify a component in the design. Since a design may include both hardware and software components, the objects may include ports, signals, modules, or variables. The first part of the hierarchical path specifies the debugger tool. A hierarchical path identifier has the following format:

<application identifier>://<path component 1>/<path component 2>/ . . . .

The application identifier specifies the debugger tool through which the component is controlled. The path component i parts of the hierarchical path identifier specify the hierarchical components of the design from the highest to lowest level of the hierarchy.

The command is translated into a tool-specific command that is compatible with the debugger tool specified in the hierarchical path at step 204. At step 206, the translated command is submitted as input to the targeted debugger tool.

Any data returned by the debugger tool that processed the command is returned to the CDRE at step 208. At step 210, the output data is returned to the debugger tool that initiated the command by the CDRE. When the initiating debugger tool initially received the command and forwarded that command to the CDRE, the initiating debugger was put into a state to wait for a response. The CDRE provides any data returned in processing the command to the waiting debugger tool.

Table 1 describes the commands recognized by an example CDRE and the associated functions in the different debugger tools.

TABLE 1

|  | Hardware co-simulation | Hardware debugger | Embedded system debugger | HDL simulator |
|---|---|---|---|---|
| read | read the current value of a signal, a shared register or a shared memory location | read the current value of a signal or the last captured samples of a signal | read the current value of a variable or a memory location | read the current value of a signal |
| write | modify the value of a signal, a shared register, or a shared memory location | modify the value of a signal | modify the value of a variable or a memory location | modify the value of a signal |
| frame | obtain data such as input and output port values, of a module of the current design clock cycle | obtain data such as values of captured samples, of the current capture buffer | obtain data such as local variables and function arguments of a frame in the current call stack | obtain data such as input and output port values of a module of the current simulation cycle |
| step | advance the design clock for a specified number of cycles | advance the signal capture for a specified number of samples | advance the program execution for a specified number of instruction units | advance the simulation for a specified number of cycles |
| continue | continue the design execution by re-enabling the design clock | continue the signal capture | continue the program execution | continue the design simulation |
| break | pause the design execution by disabling the design clock | pause the signal capture | pause the program execution | pause the design simulation |
| trigger | set up an interrupt to disable the design clock and pause co-simulation under given conditions | set up one or more match units to trigger the capture under given conditions | set up a software or hardware breakpoint to pause the program execution at a specified location under given conditions | set up a breakpoint to pause the simulation under given conditions |

As mentioned above, one embodiment of the invention includes an API through which functions of the CDRE may be accessed by a program or script. The API follows the style of dynamic programming languages, for example, Python, Ruby, or JavaScript, where values are dynamically typed. A value can be a simple "scalar" such as Number, Boolean, and String, or a complex "container" such as Sequence and Dictionary, or a "higher-order object" such as Function. The CDRE handles the conversion of values into respective values/objects in each debugger tool. Object identifiers (objectID) are specified in the hierarchical format described above.

Table 2 provides examples of function signatures of the commands in Table 1.

TABLE 2

```
value = Read(objectID)
Write(objectID, value)
value = Frame(objectID)
Step(objectID, value)
Continue(objectID)
Break(objectID)
Trigger(objectID, predicate, callback)
    predicate is a Function with signature:
    booleanValue = Function(arguments)
    callback is a Function with signature:
    Function(objectID, arguments)
    arguments is a Sequence of values.
```

Figure 3:
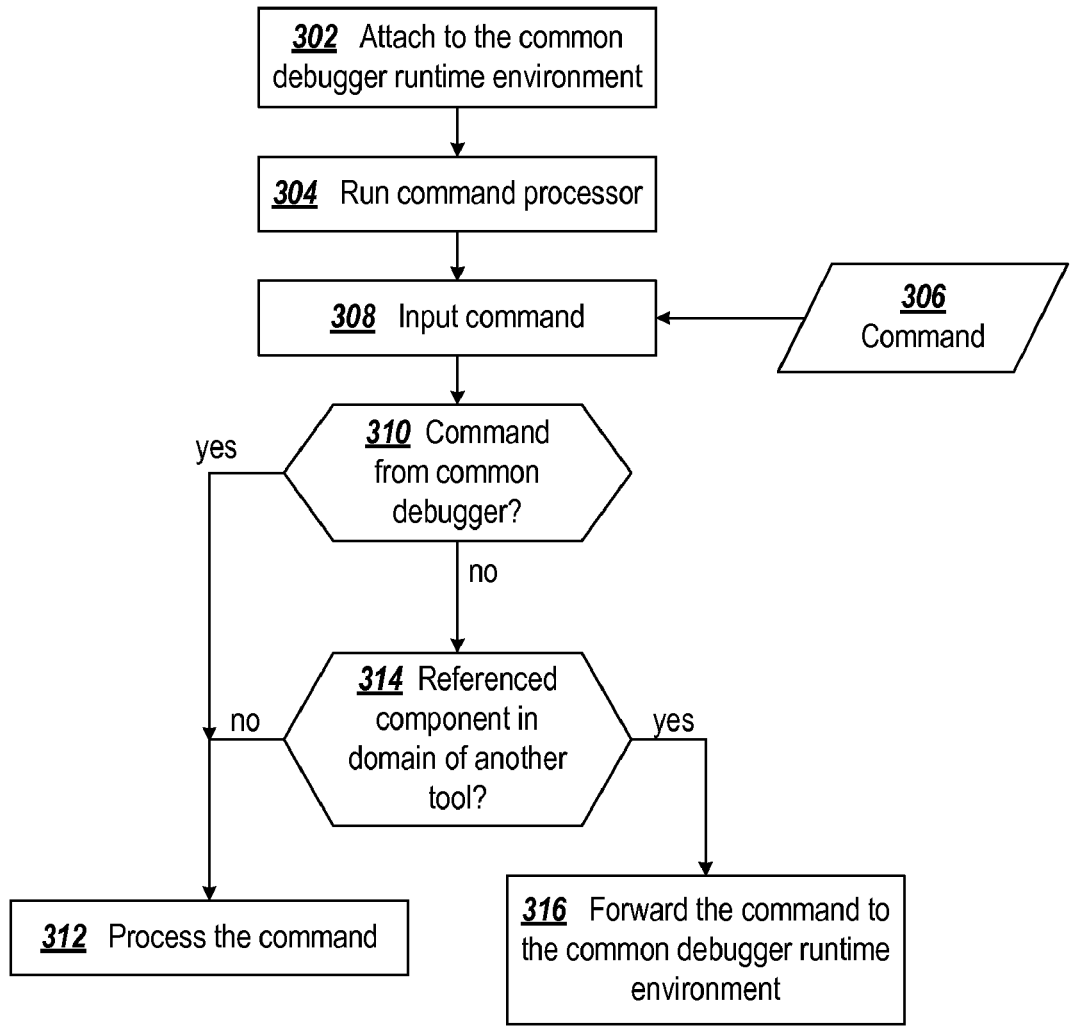
FIG. 3 is a flowchart of an example process performed by a debugger tool in accordance with one or more embodiments of the invention.

FIG. 3 is a flowchart of an example process performed by a debugger tool in accordance with one or more embodiments of the invention. The debugger tool attaches to the CDRE at step 302, which may be a dynamically linked library, for example. The command processor module of the debugger tool is executed at step 304. The command processor module inputs a debugger command 306 at step 308. If the command is from the CDRE, which means the command is from another debugger tool, decision step 310 directs the process to step 312 to process the command.

If the command is not from the CDRE, the process proceeds to decision step 314, to check which debugger tool controls the component that is referenced in the command. If the referenced component is controlled by another debugger tool, the command is forwarded to the CDRE at step 316 for dispatch to the proper debugger tool. Otherwise, the command is processed by the debugger tool through which the command was initially entered.

Figure 4:
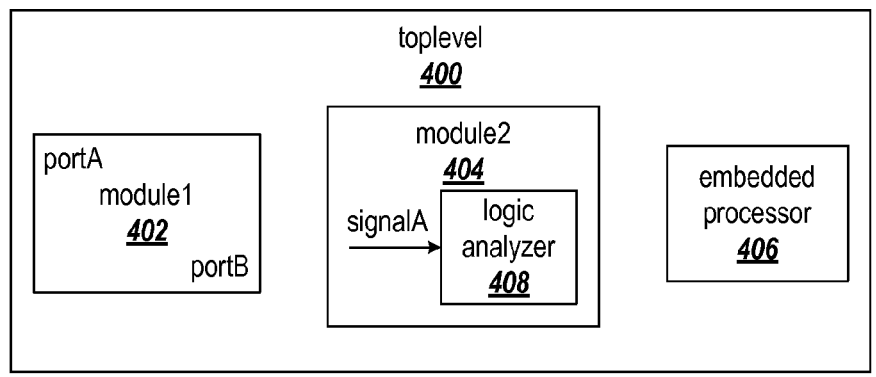
FIG. 4 shows an example of a portion of a hierarchical design including a top level, module1, module2, and an embedded processor.

The description accompanying FIG. 4 provides example use cases involving the CDRE with a hardware co-simulation simulator, a hardware debugger, an embedded system debugger, and an HDL simulator. FIG. 4 shows an example of a portion of a hierarchical design including a top level 400, module1 402, module2 404, and an embedded processor 406. Module 2 includes a logic analyzer module 408 which is generally accessed by a hardware debugger. Part of the example design includes software executing on embedded processor 406 and is accessed during system simulation using an embedded system debugger.

Table 3 shows example commands entered into a hardware co-simulation simulator for accessing module 1 as a hardware co-simulation component and accessing signalA via the CDRE and hardware debugger.

TABLE 3

```
mod1 = Hwcosim ('toplevel/module1');
//access regular hardware co-simulation object
value = read (mod1, 'portB');// read the current value of portB
write (mod1, 'portA', 123);// write a value to portA
run (mod1, 2);// step the clock for 2 cycles
ila0 = Hwcosim('chipscope://toplevel/
module2/logicanalyzer'); // access the logic analyzer core
values = read (ila0, 'signalA', 10); // read the last 10 samples of signalA
run (ila0, 10);// advance the capture for 10 more samples
```

Table 4 shows example commands entered when using an embedded system debugger where one of the objects accessed is a component controlled by the hardware co-simulation simulator.

TABLE 4

```
>load hwcosim://toplevel // access to hardware co-simulation object
>print module1.portB
    // Read the current value of portB in module1 through
    hardware co-simulation simulator.
    // The module is treated as a struct and the
    ports are treated as fields of the struct.
    // The embedded system debugger command is
    translated into the following hardware co-simulation
    // simulator command: read (mod1, 'portB).
>step
    // Step the design clock 1 cycle.
    // The embedded system debugger command is
    translated into the following hardware co-simulation
    // simulator command: run (mod1, 1).
>watch module1.portB <3
    // Break when the value of portB is less than 3.
>break module2.signalA
    //Break when the value of signalA in module2 changes.
```

Table 5 shows an example in which hardware debugger commands are entered for viewing a component controlled by the hardware co-simulation simulator.

TABLE 5

```
>scope hwcosim://toplevel/module1 //
access to hardware co-simulation object
>show value ports
    // Read the current value of portB in module1 through the
    hardware co-simulation simulator
    // The module is treated as a struct and the ports are
    treated as fields of the struct
    // The hardware debugger command is translated into the
    following hardware co-simulation simulator
    / command: read (mod1, 'port13')
>put value portA 2
    // Write 2 to portA in module1 through the
    hardware co-simulation simulator
    // The hardware debugger is translated into the following
    hardware co-simulation simulator command:
    // write (mod1, 'portA', 2)
> run 10 ns
    // Step the design clock for 1 cycle
    (assuming a clock period =10 ns)
    // The hardware debugger command is translated into the
    following hardware co-simulation simulator
    // command: run (mod1, 1)
>isim condition add {portB}{stop}
    // Break when the value of portB in module1 is less than 3.
```

Table 6 shows the common debugger API 162 equivalent to the commands in Table 3.

TABLE 6

```
mod1 = CDRE_GetObject ('hwcosim://toplevel/module1');
// access hardware co-simulation object
value = read (mod1, 'portB');// read the current value of portB
write (mod1, 'portA', 123);// write a value to portA
step (mod1, 2);// step the clock for 2 cycles
ila0 =CDRE_GetObject ('chipscope://toplevel/module2/logicanalyzer');
// access the logic analyzer core
values =read (ila0, 'signalA', 10);// read the last 10 samples of signalA
step (ila0, 10);// advance the capture for 10 more samples
```

Figure 5:
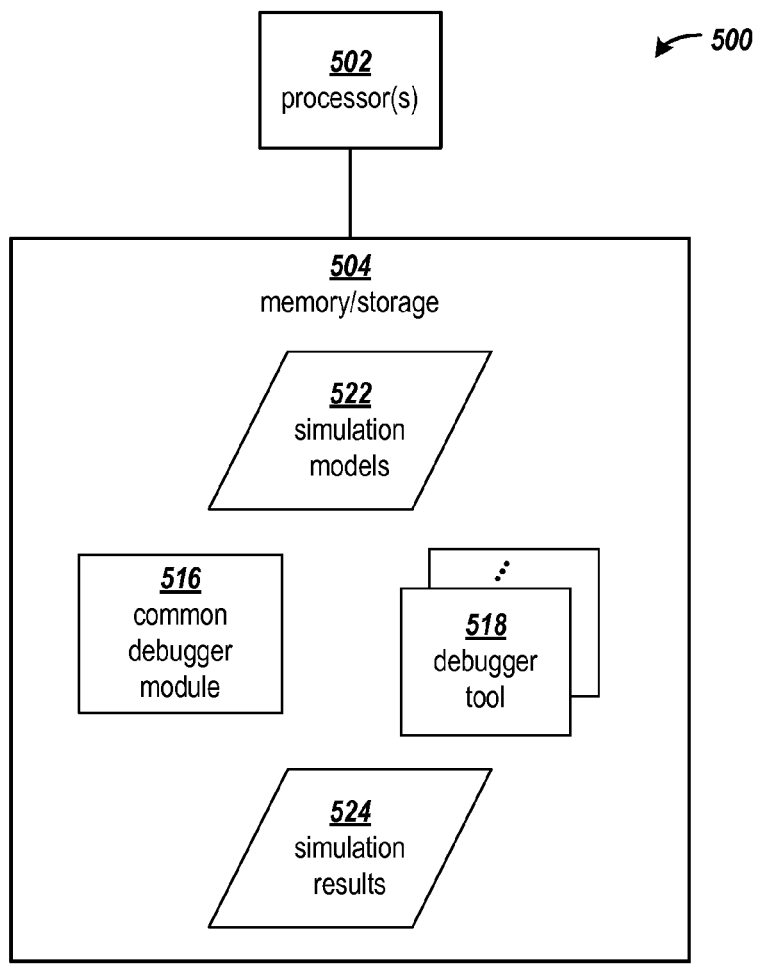
FIG. 5 is a block diagram of an example computing arrangement on which the processes described herein may be implemented.

FIG. 5 is a block diagram of an example computing arrangement on which the processes described herein may be implemented. Those skilled in the art will appreciate that various alternative computing arrangements, including one or more processors and a memory arrangement configured with program code, would be suitable for hosting the processes and data structures and implementing the processes of the different embodiments of the present invention. In addition, program code that implements the processes may be provided via a variety of computer-readable storage devices or delivery channels such as magnetic or optical disks or tapes, electronic storage devices, or as application services over a network.

Computing arrangement 500 includes one or more processors 502 coupled to a memory/storage arrangement 504. The architecture of the computing arrangement depends on implementation requirements as would be recognized by those skilled in the art. The processor 502 may be one or more general purpose processors, or a combination of one or more general purpose processors and suitable co-processors, or one or more specialized processors (e.g., RISC, pipelined, etc.).

The memory/storage arrangement 504 is representative of hierarchical storage commonly found in computing arrangements. Such hierarchical storage typically includes multiple levels of cache memory, a main memory, and local and/or remote persistent storage such as provided by magnetic disks (not shown). The memory/storage arrangement may include one or both of local and remote memory/storage, remote storage being coupled to the processor arrangement via a local area network, for example.

The processor arrangement 502 executes the software stored in memory/storage arrangement 504, and reads data from and stores data to the memory/storage arrangement according to the processes described above. An operating system (not shown) manages the resources of the computing arrangement. The common debugger module 516 provides the CDRE for use in combination with the debugger tools 518 as described above. The debugger tools simulate an electronic circuit design using various simulation models 522. As described in FIG. 1, one or more of the debugger tools may be used in emulating part of the design in hardware, while others of the tools simulate parts of the design in software. The results 524 of the simulation and emulation may be stored in the memory arrangement or output to a display device.

The present invention is believed to be applicable to a variety of systems for debugging electronic circuit designs. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for operating a plurality of debugger tools in an electronic system, the method comprising:

inputting a first tool-specific command to a first of the debugger tools, the first tool-specific command formatted for the first debugger tool and referencing a component of a respective set of one or more components controlled by a second one of the debugger tools, wherein each of the debugger tools provides control over a respective set of one or more components of the electronic system, and each debugger tool comprises at least one of a hardware debugger, an embedded systems debugger, a hardware description languages (HDL) simulator/debugger, or a hardware co-simulation simulator, and each debugger tool recognizes a respective set of tool-specific commands for operating the debugger tool, and the tool-specific commands are incompatible between debugger tools;

in response to the first debugger tool determining that the first tool-specific command references the component of the respective set controlled by the second debugger tool, forwarding the first tool-specific command to a common debugger executing on a computing arrangement;

translating the first tool-specific command into a tool-specific command that is compatible with the second debugger;

outputting the translated tool-specific command from the common debugger to the second debugger tools; and performing the translated tool-specific command by the second debugger tools.

2. The method of claim 1, further comprising, in response to receiving output data from the second debugger tool by the common debugger for the translated command, providing the output data to the first debugger tool and displaying the output data by the first debugger tool.

3. The method of claim 1, further comprising:

inputting first-type commands to the common debugger, each first-type command referencing one of the debugger tools;

translating each input first-type command into a respective tool-specific command that is compatible with the one of the debugger tools specified in the first-type command;

outputting each respective tool-specific command from the common debugger to the one of the debugger tools specified in the input first-type command from which the respective tool-specific command was translated; and performing each respective tool-specific command by the one of the debugger tools specified in the input first-type command from which the respective tool-specific command was translated.

4. The method of claim 3, wherein the first-type commands are input from a script.

5. The method of claim 3, wherein the first-type commands are input via an application programming interface.

6. The method of claim 3, wherein the inputting of first-type commands to the common debugger includes commands from a script and from an application programming interface.

7. The method of claim 3, wherein a component of the design is referenced by a hierarchical path in at least one of the first-type commands.

8. A method for operating two or more debugger tools in an electronic system, the method comprising:

coupling the debugger tools to a common debugger, wherein each of the debugger tools provides control over a respective set of one or more components of the electronic system via a respective command entry interface, and each debugger tool comprises at least one of a hardware debugger, an embedded systems debugger, a hardware description languages (HDL) simulator/debugger, or a hardware co-simulation simulator;

for each one of the debugger tools, in response to input to the one debugger tool of a command referencing a component of the respective set controlled by another one of the debugger tools, accessing the component controlled by the another one of the debugger tools from the command entry interface of the one debugger tool via the common debugger and the another one of the debugger tools; and in response to a script of commands input to the common debugger, one or more of the commands specifying a particular one of the debugger tools, translating the commands of the script into tool-specific commands for the particular one debugger tool and providing the tool-specific commands to the particular one debugger tool.

9. The method of claim 8, further comprising, in response to receiving output data from the another one of the tools by the common debugger, providing the output data to the one of the debugger tools and displaying the output data by the one of the debugger tools.

10. The method of claim 8, wherein a component of the design is referenced by a hierarchical path in the command.

11. A system, comprising:

a computing arrangement including one or more processors coupled to a processor-readable storage device storing executable instructions for operating a plurality of debugger tools, the instructions when executed by the one or more processors causing the one or more processors to perform operations including:

inputting a first tool-specific command to a first of the debugger tools, the first tool-specific command formatted for the first debugger tool and referencing a component of a respective set of one or more components controlled by a second one of the debugger tools, wherein each of the debugger tools provides control over a respective set of one or more components of the electronic system, and each debugger tool comprises at least one of a hardware debugger, an embedded systems debugger, a hardware description languages (HDL) simulator/debugger, or a hardware co-simulation simulator, and each debugger tool recognizes a respective set of tool-specific commands for operating the debugger tool, and the tool-specific commands are incompatible between debugger tools;

in response to the first debugger tool determining that the first tool-specific command references the component of the respective set controlled by the second debugger tool, forwarding the first tool-specific command to a common debugger executing on a computing arrangement;

translating the first tool-specific command into a tool-specific command that is compatible with the second debugger tool;

submitting the translated tool-specific command from the common debugger to the second debugger tool; and performing the translated tool-specific command by the second debugger tool.

12. The system of claim 11, wherein the first-type commands are input from a script.

13. The system of claim 11, the operations further comprising, in response to receiving output data from the second debugger tool by the common debugger for the submitted respective command as translated from the first tool-specific command, providing the output data to the first debugger tool and displaying the output data by the first debugger tool.

14. The system of claim 11, the operations further including:

inputting first-type commands to the common debugger, each first-type command referencing one of the debugger tools;

translating each input first-type command into a respective tool-specific command that is compatible with the one of the debugger tools specified in the first-type command;

outputting each respective tool-specific command from the common debugger to the one of the debugger tools specified in the input first-type command from which the respective tool-specific command was translated; and performing each respective tool-specific command by the one of the debugger tools specified in the input first-type command from which the respective tool-specific command was translated.

15. The system of claim 14, wherein the first-type commands are input via an application programming interface.

16. The system of claim 14, wherein the inputting of first-type commands to the common debugger includes commands from a script, from an application programming interface, and from the debugger tools.

17. The system of claim 14, wherein a component of the design is referenced by a hierarchical path in at least one of the first-type commands.

\* \* \* \* \*